United States Patent
Edgar et al.

(10) Patent No.: US 7,406,628 B2
(45) Date of Patent: Jul. 29, 2008

(54) SIMULATED ERROR INJECTION SYSTEM IN TARGET DEVICE FOR TESTING HOST SYSTEM

(75) Inventors: Brian T. Edgar, Bloomington, MN (US); Feng Li, Victoria, MN (US); Mark A. Schmidt, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 446 days.

(21) Appl. No.: 10/823,225

(22) Filed: Apr. 13, 2004

(65) Prior Publication Data
US 2005/0015679 A1 Jan. 20, 2005

Related U.S. Application Data

(60) Provisional application No. 60/487,806, filed on Jul. 15, 2003.

(51) Int. Cl.
*G06F 11/00* (2006.01)
(52) U.S. Cl. .............................. 714/43; 714/41; 714/49; 714/54; 714/703
(58) Field of Classification Search .................... 714/41, 714/43, 49, 54
See application file for complete search history.

(56) References Cited

U.S. PATENT DOCUMENTS

| | | | | |
|---|---|---|---|---|
| 4,759,019 A | * | 7/1988 | Bentley et al. | 714/703 |
| 4,914,657 A | * | 4/1990 | Walter et al. | 714/4 |
| 4,999,837 A | * | 3/1991 | Reynolds et al. | 714/703 |
| 5,012,465 A | * | 4/1991 | Helou et al. | 370/360 |
| 5,138,617 A | * | 8/1992 | Edwards | 714/2 |
| 5,210,758 A | * | 5/1993 | Gomez | 714/6 |
| 5,363,379 A | * | 11/1994 | Eckenrode et al. | 714/703 |
| 5,414,713 A | * | 5/1995 | Waschura et al. | 714/715 |
| 5,428,624 A | * | 6/1995 | Blair et al. | 714/727 |
| 5,574,855 A | * | 11/1996 | Rosich et al. | 714/41 |
| 5,671,352 A | * | 9/1997 | Subrahmaniam et al. | 714/41 |
| 5,796,938 A | * | 8/1998 | Emberty et al. | 714/27 |
| 5,872,910 A | | 2/1999 | Kuslak | |
| 5,938,779 A | * | 8/1999 | Preston | 714/718 |
| 6,134,676 A | | 10/2000 | VanHuben | |
| 6,182,248 B1 | * | 1/2001 | Armstrong et al. | 714/43 |
| 6,304,984 B1 | | 10/2001 | Neal | |
| 6,327,676 B1 | * | 12/2001 | Abramov et al. | 714/37 |
| 6,336,088 B1 | * | 1/2002 | Bauman et al. | 703/15 |
| 6,457,147 B1 | * | 9/2002 | Williams | 714/703 |
| 6,484,274 B1 | | 11/2002 | Lee | |
| 6,484,276 B1 | * | 11/2002 | Singh et al. | 714/41 |
| 6,519,718 B1 | * | 2/2003 | Graham et al. | 714/41 |
| 6,535,936 B2 | * | 3/2003 | Young | 710/62 |

(Continued)

FOREIGN PATENT DOCUMENTS

JP          62259104 A  * 11/1987

*Primary Examiner*—Scott Baderman
*Assistant Examiner*—Loan Truong
(74) *Attorney, Agent, or Firm*—David K. Lucente

(57) ABSTRACT

A method and device are provided that use a sequencer in the device to control interactions on an interface bus. The sequencer is programmed to interrupt a co-processor before execution of a command. Based on the interrupt signal and a stored error mode page, a false error condition is initiated by further programming the sequencer to operate abnormally. After recovery from the error condition, the sequencer is reprogrammed to operate normally.

20 Claims, 8 Drawing Sheets

U.S. PATENT DOCUMENTS

| | | |
|---|---|---|
| 6,539,503 B1 | 3/2003 | Walker |
| 6,546,507 B1 | 4/2003 | Coyle |
| 6,560,720 B1 * | 5/2003 | Chirashnya et al. ............ 714/32 |
| 6,590,929 B1 * | 7/2003 | Williams .................... 375/224 |
| 6,604,211 B1 | 8/2003 | Heiman |
| 6,609,221 B1 | 8/2003 | Coyle |
| 6,701,460 B1 * | 3/2004 | Suwandi et al. ............... 714/41 |
| 6,718,413 B1 * | 4/2004 | Wilson et al. ............... 710/260 |
| 6,751,756 B1 * | 6/2004 | Hartnett et al. ............... 714/54 |
| 6,807,581 B1 * | 10/2004 | Starr et al. ................. 709/250 |
| 6,886,116 B1 * | 4/2005 | MacLellan et al. ............ 714/41 |
| 6,976,189 B1 * | 12/2005 | Schoenthal et al. ........... 714/41 |
| 6,981,173 B2 * | 12/2005 | Ferguson et al. ............... 714/5 |
| 7,020,803 B2 * | 3/2006 | Wolin et al. .................. 714/41 |
| 7,065,677 B1 * | 6/2006 | Hughes ....................... 714/38 |
| 7,107,490 B2 * | 9/2006 | Eisenhoffer et al. ........... 714/30 |
| 7,124,205 B2 * | 10/2006 | Craft et al. ................. 709/250 |
| 7,343,514 B2 * | 3/2008 | Yamato et al. ................. 714/6 |
| 2002/0083262 A1 * | 6/2002 | Fukuzumi ................... 711/103 |
| 2002/0095624 A1 * | 7/2002 | Cabezas et al. ............... 714/43 |
| 2002/0138510 A1 * | 9/2002 | Tan ........................ 707/501.1 |
| 2003/0014580 A1 * | 1/2003 | Young ........................ 710/305 |
| 2003/0172321 A1 * | 9/2003 | Wolin et al. .................. 714/41 |
| 2003/0179712 A1 * | 9/2003 | Kobayashi et al. .......... 370/249 |
| 2003/0226062 A1 * | 12/2003 | Gender et al. ................. 714/38 |
| 2004/0199718 A1 * | 10/2004 | Byers et al. ................. 711/112 |
| 2004/0225932 A1 * | 11/2004 | Hoda et al. .................. 714/703 |
| 2004/0267516 A1 * | 12/2004 | Jibbe et al. ................... 703/24 |

* cited by examiner

SIMULATED ERROR INJECTION SYSTEM IN TARGET DEVICE FOR TESTING HOST SYSTEM

RELATED APPLICATIONS

This application claims the benefit of U.S. Provisional Application No. 60/487,806, filed Jul. 15, 2003 and entitled "An Extensible Error Injection Scheme in Target Device For Testing Host Computer System."

FIELD OF THE INVENTION

The present invention relates to generating false errors on a device. In particular, the present invention relates to generating false errors on a device that communicates over an interface bus.

BACKGROUND OF THE INVENTION

In the relentless drive to improve computer performance, there is a growing interest in designing computer systems that can recover spontaneously from errors generated by the various components of the system. In particular, there is interest in building and testing error recovery systems that can respond to errors generated by devices connected along a bus that communicate with a host processor through one or more host bus adapters. Examples of such devices include data storage devices such as hard disc drives, CD ROM drives, and DVD drives. The ability to handle errors generated by such devices has been difficult to test because the devices are highly reliable and as such do not generate errors frequently enough to make testing efficient.

To improve testing efficiency, it has been proposed that these devices generate errors on demand. Ideally, such devices should be able to operate in two modes, one in which false errors can be generated on demand and one in which the device operates properly. In addition, the device should be able to seamlessly move between these two operating modes. This requires some care, because the generation of errors can render inoperable the interface used to instruct the device to return to the proper operating mode.

A device was designed by the Assignee of the present application that was able to generate false errors on a serial fiber-channel bus. However, the types of errors that could be generated were limited. For example, although the Fiber Channel device was able to simulate a command timeout error by ignoring a command, it was not able to perform part of a command and then timeout before finishing the command. Additionally, data miscompare errors where the data that is returned during a read operation is corrupted could not be artificially produced on the Fiber Channel device. The Fiber Channel device also had a limited ability to return specific sense data that indicated details of an error because it did not allow the requester of the error to designate sense data from the full range of possible sense data that can be returned during normal operations. In addition, the design of the Fiber Channel device was specific to the Fiber Channel Interface and did not provide an implementation of false error generation on a device that communicates across a small computer system interface parallel bus.

Embodiments of the present invention provide solutions to these and other problems, and offer other advantages over the prior art.

SUMMARY OF THE INVENTION

A method and device are provided that use a sequencer in the device to control interactions on an interface bus. The sequencer is programmed to interrupt a co-processor before execution of a command. Based on the interrupt signal and a stored error mode page, a false error condition is initiated by further programming the sequencer to operate abnormally. After recovery from the error condition, the sequencer is reprogrammed to operate normally.

DETAILED DESCRIPTION OF ILLUSTRATIVE EMBODIMENTS

Figure 1:
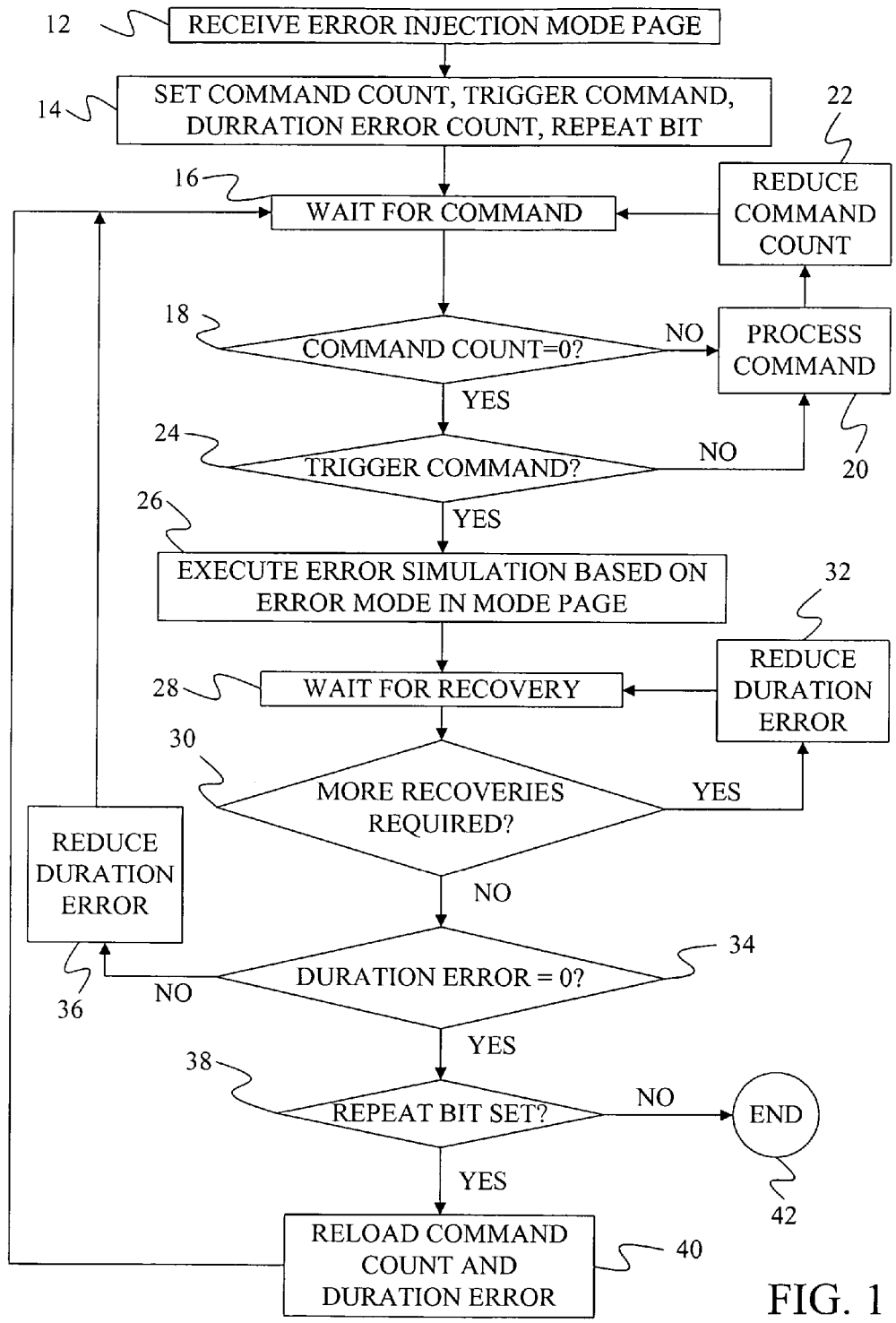
FIG. 1 is a flow chart of a method for generating false errors on a device connected to an interface bus, according to one embodiment of the present invention.
Figure 2:
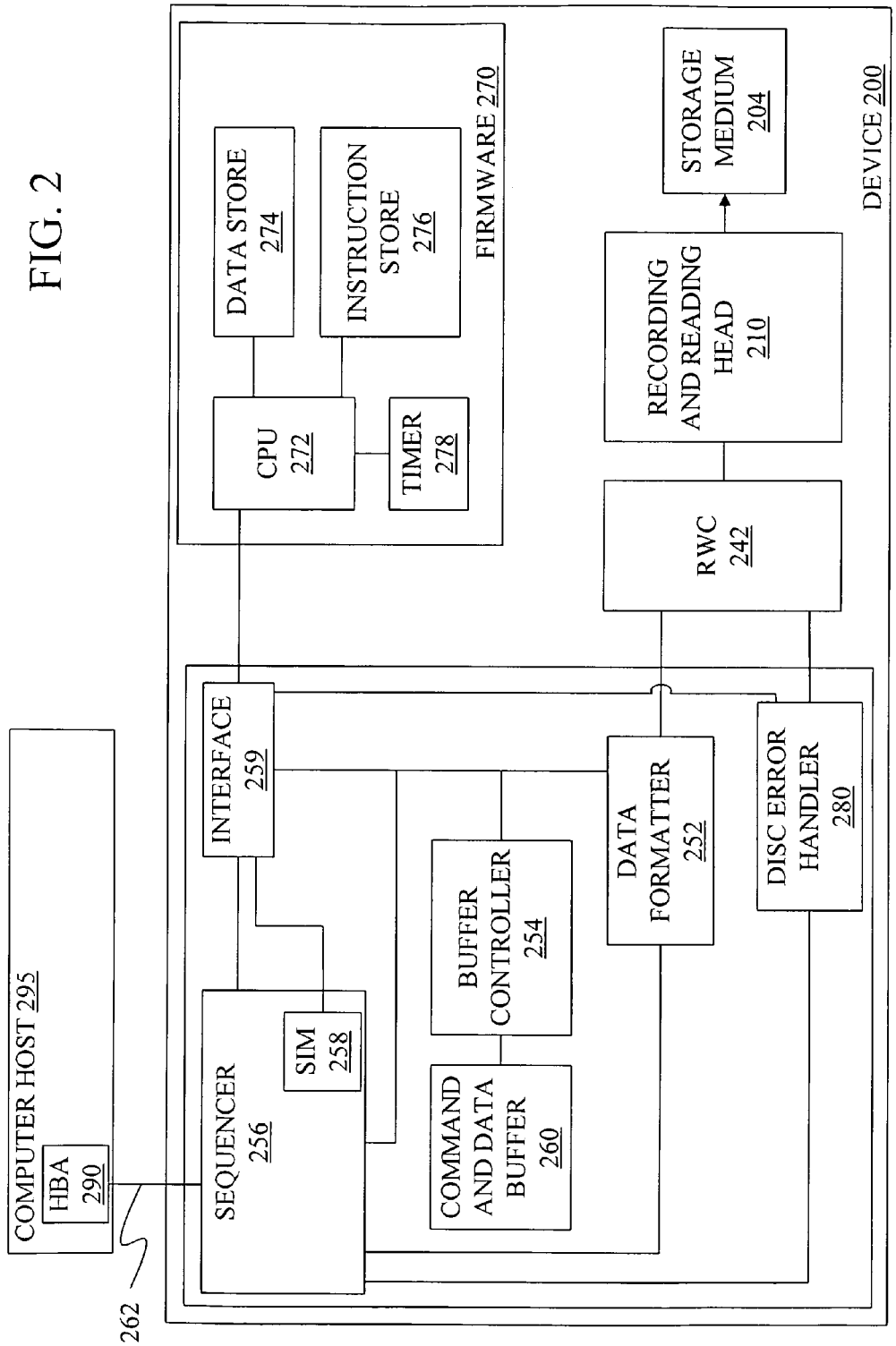
FIG. 2 is a block diagram of a device and a host system, according to one embodiment of the present invention.

FIG. 1 is a flow chart of a method, according to one embodiment of the present invention, for generating errors in a Small Computer Systems Interface (SCSI) device to test the error handling capabilities of a host system. The method of FIG. 1 is described below with reference to the block diagram of FIG. 2, which depicts a host system connected to a SCSI device. In particular, FIG. 2 shows a host system connected to a SCSI data storage device.

The process of FIG. 1 begins at step 12 where an error injection mode page is received by data storage system 200 from a host computer system 295. Specifically, the error injection mode page is transmitted from a host bus adapter 290 along SCSI parallel interface bus 262 to sequencer 256 in data storage system 200. Sequencer 256 uses buffer controller 254 to store the error mode page in command buffer 260, which in one embodiment is a dynamic random access memory. Sequencer 256 also sends an interrupt through an interface 259 to CPU 272 of firmware 270, which acts as a co-processor with sequencer 256. In response, CPU 272 transfers the error mode page to instruction store 276 in firmware 270.

Figure 3:
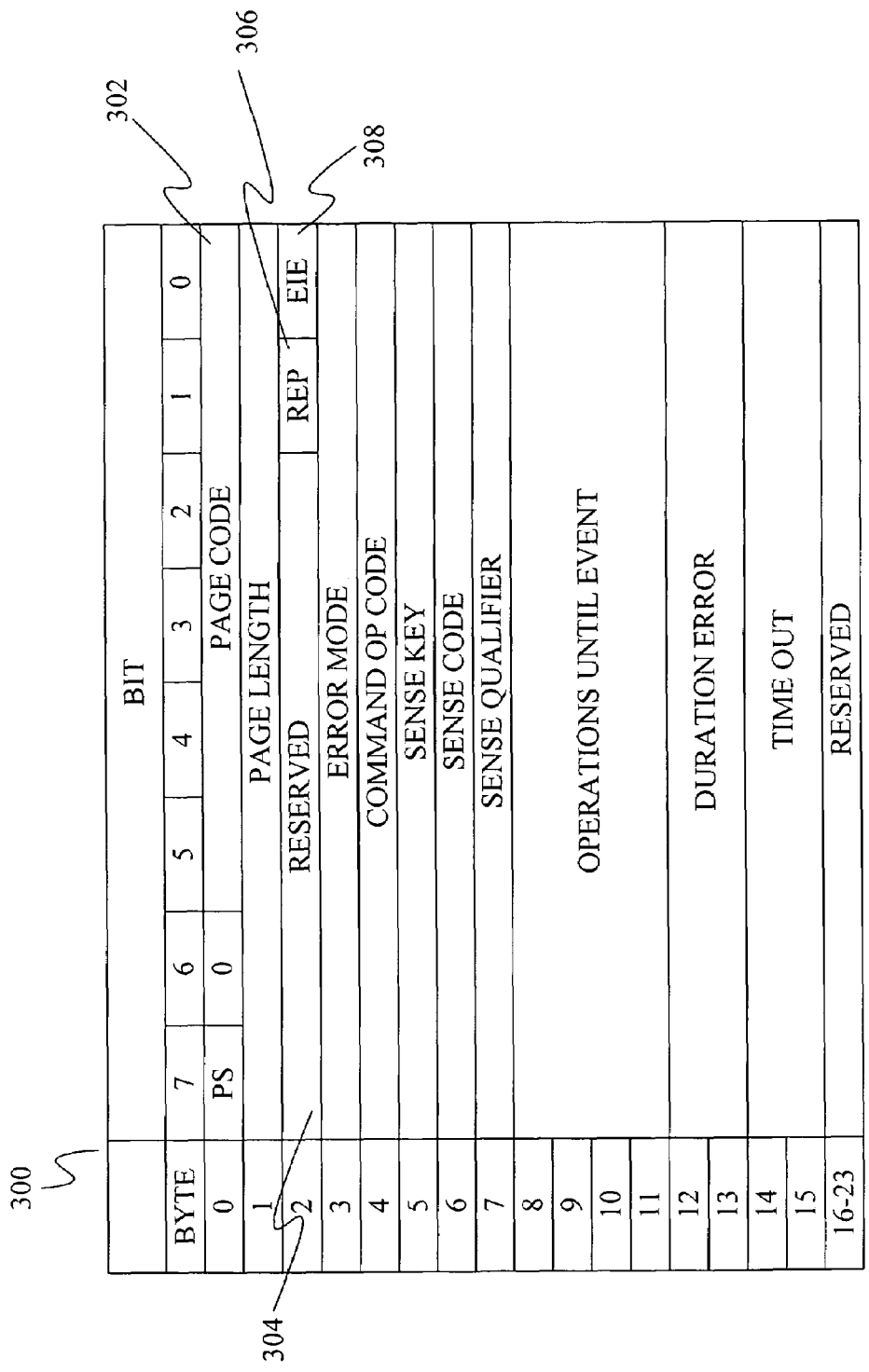
FIG. 3 is a layout of an error injection mode page, according to one embodiment of the present invention.

FIG. 3 depicts the layout of an error injection mode page 300 under one embodiment of the present invention. In the embodiment of FIG. 3, error injection mode page 300 is a 24 byte data structure. Byte 0 of error injection mode page 300 includes a Parameter Savable bit PS that indicates whether the page is savable on the data storage device and a page code field 302 that indicates that this is an error injection mode page. Byte 1 indicates the length of the error injection mode page.

Byte 2 includes a reserved field 304, a Repeat bit 306 and an Error Injection Enable bit 308. Repeat bit 306 indicates whether the error production sequence represented by the page should be repeated until a new error injection mode page is received. Error Injection Enable bit 308 indicates whether the page stored in instruction store 276 should be executed. Error Injection Enable bit 308 is initially set to 1 to indicate that the error page should be executed. The bit is set to 0 after the error routine of the page has executed successfully, the drive power cycles, or the user changes the setting through a mode select.

Byte 3 is an Error Mode field that indicates the type of error to be produced. Examples of different possible error modes and how they are implemented under the present invention are discussed in more detail below.

Byte 4 contains a Command Op Code that indicates a target command that will trigger the production of the error when the command is received by sequencer 256. Only commands that are consistent with the selected error mode set in the Error Mode field produce the error. If a command is included that is not allowed for an error mode, the device will reject the mode page as an illegal request.

Bytes 5, 6 and 7 provide a sense key, a sense code, and a sense qualifier, respectively. When an Error Mode of zero is selected, the sense key, sense code and sense qualifier are returned as the error value.

Bytes 8-11 provide an Operations Until Event field that controls a number of operations a data storage system will count through, after receiving the simulated error mode communicated to it, before arming an error trigger. The operations until event number may be any number from zero to an arbitrarily high number. Once the operations until event number has been reached and the error trigger has been armed, the data storage system is poised to generate a simulated error upon receiving the next command that matches the criteria for error generation (which includes matching the Command Op Code field in some error modes).

Bytes 12 and 13 provide a Duration of Error field that applies only to certain error modes in this embodiment, and that is used in different ways in different error modes. For example, in some error modes, the duration of error value indicates the number of times the same error should be generated once the Operations Until Event counter has expired. In other error modes, the Duration of Error value indicates the number of times an external recovery operation must be received to recover from an error. Once a number of recovery operations equal to the duration of error value have been received, the simulated error is resolved. The specific application of the duration of error value for each error mode is described further below, with reference to those specific error modes.

Bytes 14-15 provide a time-out field that contains a hang time that is used during error events in which the sequencer hangs in a particular state as described in further detail below.

Bytes 16-23 are reserved for later use.

Upon receiving the error injection mode page at step 12, CPU 272 examines the page and uses the values in the fields to select a set of instructions for CPU 272 from instruction store 276. CPU 272 also sets the values of a collection of variables in a data store 274 that are used to execute the instructions. In particular, CPU 272 sets a command count, a trigger command, a duration error count, and a repeat count using the Operations Until Event field, the Command Op Code field, the Duration of Error field, and the repeat bit of the error injection mode page, respectively, at step 14.

Once the values are set, CPU 272 waits for sequencer 256 to receive a command at step 16. When a command is received, sequencer 256 stores the command in command buffer 260 using command buffer controller 254. Sequencer 256 also sends an interrupt to CPU 272 through an interface 259 to indicate that a new command has been received and stored in command buffer 260.

At step 18, CPU 272 evaluates the command count to determine if it is equal to zero. If the command count is greater than zero, CPU 272 instructs sequencer 256 to execute the command at step 20. When the command finishes execution, CPU 272 reduces the command count by one at step 22 and returns to step 16 to wait for the next command.

When the command count is equal to zero at step 18, the number of commands set in the Operations Until Event field of the error injection mode page have been observed and the command trigger can be set. At step 24, CPU 272 determines if the command in command buffer 260 is the trigger command by accessing command buffer 260 through interface 259 and buffer controller 254. If the command in buffer 260 is not the trigger command, the command is processed at step 20 and the process returns to step 16 to await the next command.

When the trigger command is received at step 24, CPU 272 programs sequencer 256 at step 26 to execute a set of instructions to simulate the error listed in the error mode field of the error injection mode page. These instructions are stored in a sequencer instruction memory 258 through interface 259. Examples of specific instructions are described below for the individual errors that can be set in the error mode field. Once the instructions are set in memory 258, they are executed by sequencer 256.

At step 28, CPU 272 and sequencer 256 wait for an error recovery signal from host bus adapter 290. Examples of such signals include bus resets, power cycles, Message Abort messages, Device Message Reset messages, and mode select commands. The appropriate error recovery signal is dependent on the particular error mode.

When an error recovery signal is received, CPU 272 determines if the error mode and the duration of error field require more than one error recovery signal in order to recover from the error at step 30. If more than one error recovery signal is required, the duration of error count is reduced at step 32 and the process returns to step 28 to wait for another recovery signal.

When the required number of error recovery signals has been received at step 30, CPU 272 recovers from the error by resetting sequencer 256 so that it operates normally once again.

After the sequencer has been reset, CPU 272 determines if the duration of error count is equal to zero at step 34. If the duration of error count is not equal to zero, the duration of error count is reduced by one at step 36 and the process returns to step 16 to wait for the next command. Note that the command trigger continues to be active such that if the next command is the trigger command, an error simulation will be triggered at step 26.

When the duration of error count is equal to zero at step 34, the number of errors requested in the error injection mode page has been triggered. The process then examines the repeat bit at step 38. If the repeat bit is set, the command count and duration of error count are reset at step 40 and the process returns to step 16 to wait for a new command. Because the command count has been reset, the process will wait through the number of commands in the command count by cycling through steps 16, 18, 20, and 22 before searching for the trigger command at step 24. Thus, the repeat bit at step 38 causes the error script set by the Operations Until Event field, the error mode and the Duration of Error field to be repeated until a new error injection mode page is received. If the repeat bit is not set at step 38, the process ends at step 42.

Figure 4:
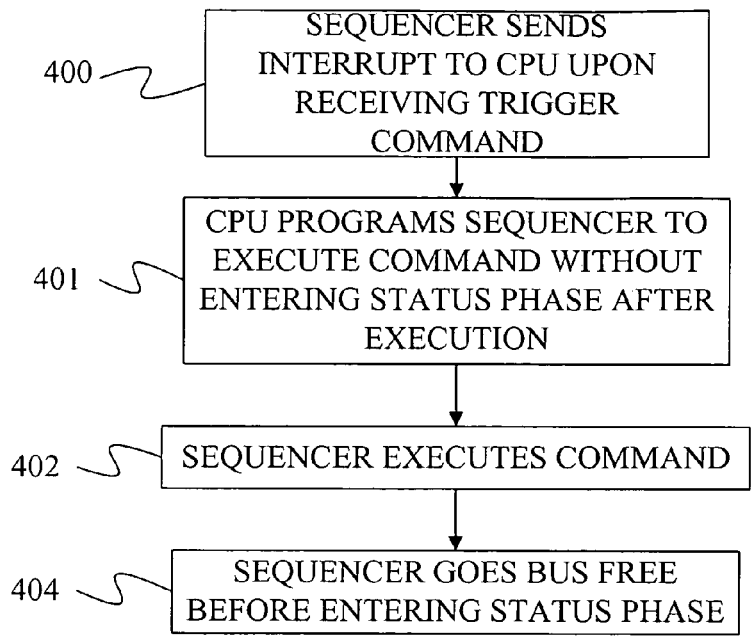
FIG. 4 is a flow diagram of a method of implementing an indefinite drop off bus error under one embodiment of the present invention.

FIG. 4 depicts one illustrative embodiment of a method of a simulated error under the present invention. In particular, the method of FIG. 4 simulates an error where sequencer 256 acts as if it is not responding to signals over the bus and is not currently using the bus. This is known as dropping off the bus. Upon receiving the triggering command, the method of FIG. 4 begins at step 400 where sequencer 256 sends an interrupt to CPU 272. Under one embodiment, any command received after the command count reaches zero will act as a triggering command. At step 401, CPU 272 programs sequencer 256 to execute the pending command but to stop operations before entering the Status phase of communicating on the bus and to instead disconnect from the bus by entering the Bus Free phase. At step 402, the sequencer executes the command and at step 404 goes Bus Free before entering the Status phase of the command. Typically, this error mode will persist until a selected number of bus reset commands has been communicated or the data storage system 200 has been put through a power cycle. Device message reset and Message Abort signals will not cause the drive to recover. The selected number of bus resets is typically the duration of error number. Upon receiving the required number of resets, CPU 272 instructs sequencer 256 to go back on the Bus and to return to normal operations.

Figure 5:
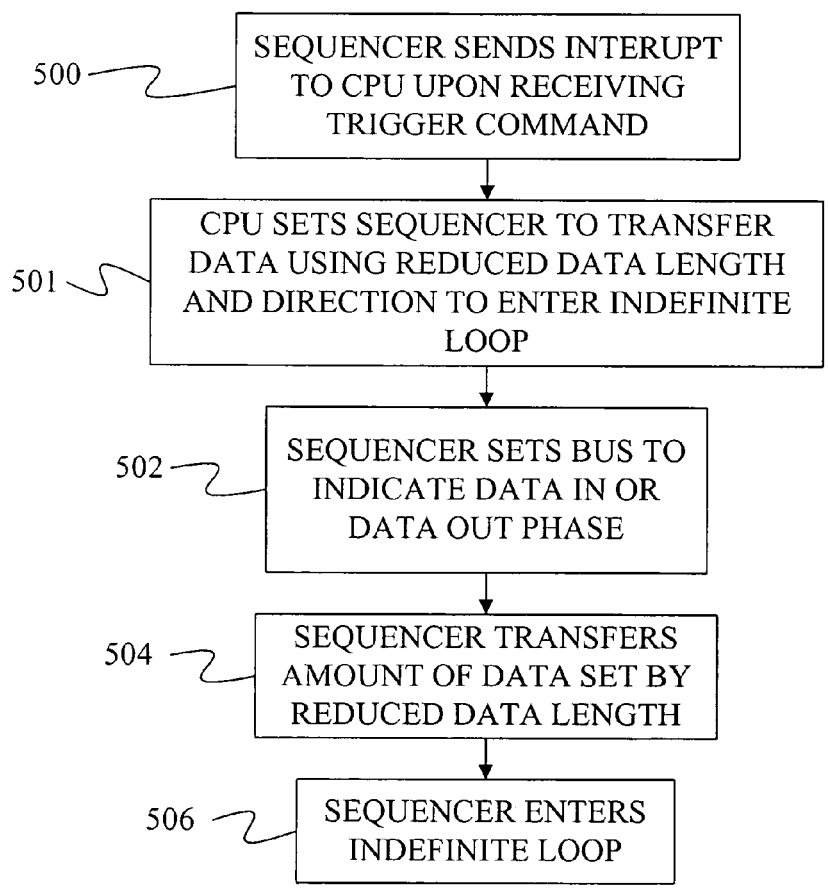
FIG. 5 is a flow diagram of a method of implementing a "hanging" error during a Data In or Data Out phase under one embodiment of the present invention.

In another illustrative embodiment, as depicted in FIG. 5, the simulated error mode includes causing the sequencer 256 to loop indefinitely in either a Data In phase or in a Data Out phase, until the data storage system is subjected to either a bus reset command or a power cycle. This is known as "hanging" on the bus during the Data In or Data Out phase.

In this embodiment, the error mode is triggered by a command that requires a Data In phase or a Data Out phase. When the triggering command is received, sequencer 256 sends an interrupt to CPU 272 at step 500. Before instructing sequencer 256 to start the data transfer, CPU 272 programs sequencer 256 at step 501 with a reduced transfer length for the data transfer, and arms sequencer 256 to loop indefinitely after transferring the data. At step 502, sequencer 256 sets the bus to indicate that it is in a Data In or Data Out state, depending on the command. Sequencer 256 then transfers the amount of data set in the reduced data length at step 504. After the data has been transferred, sequencer 256 enters an indefinite loop at step 506, during which it does not respond to signals on the bus. Note that because of the reduced transfer length, sequencer 256 has not transferred all of the data designated in the command. As a result, it appears to have "hung-up" in the middle of a data transfer. This error injection mode ends if the storage device is put through a power cycle or a bus reset is sent along the bus. Upon receiving the reset, CPU 272 reinitializes the sequencer 256, which clears the reduced data length and the indefinite loop.

Figure 6:
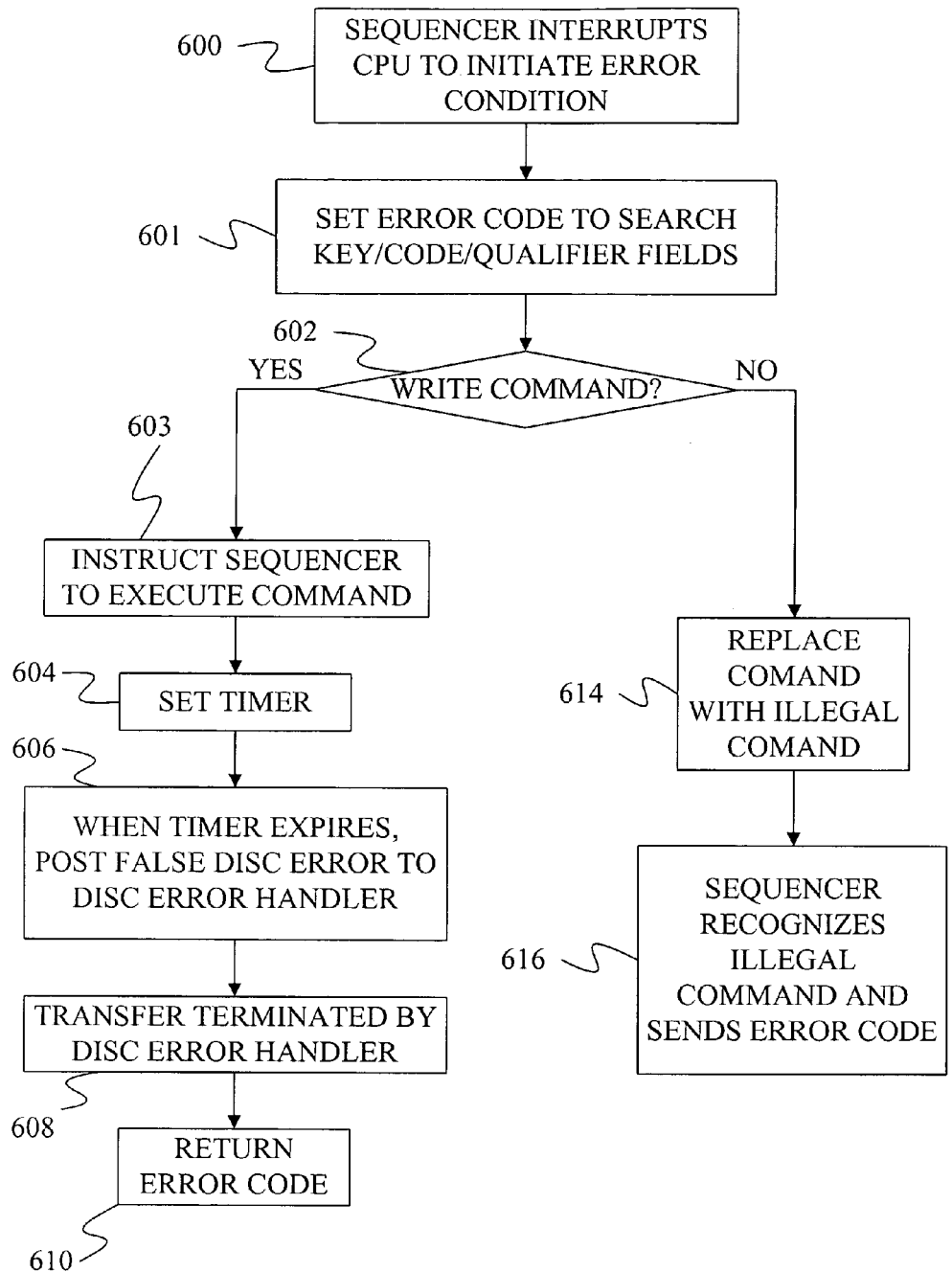
FIG. 6 is a flow diagram of a method of returning a particular error value for a designated command without causing the error to actually occur under one embodiment of the present invention.

FIG. 6 provides a flow diagram of an additional error mode in which a particular error code designated in the error injection mode page is returned for a particular command set in the Command Op Code field of the mode page. Upon receiving the triggering command set in the Command Op Code field, the process of FIG. 6 begins at step 600 where sequencer 256 sends an interrupt to CPU 272 to initiate the error process. At step 601, CPU 272 sets error code values to the values set in the sense key/code/qualifier fields in the mode page. Any of the sense key, sense code, or sense qualifier values that can be returned as an error may be designated in the sense key/code/qualifier field. This provides the ability to simulate more error types than was possible with the earlier Fiber Channel interface system described above. The command is then examined at step 602 to determine if it is a write command.

If the command is a write command, the present invention takes steps to insure that at least some data is transferred from the host before posting an error. To do this, sequencer 256 is instructed to begin executing the command at step 603. CPU 272 then sets a timer 278 at step 604. The timer period is selected to allow sequencer 256 to transfer at least one block of data. Under one embodiment, a period of 100 ms is used. When the timer expires at state 606, CPU 272 posts a fake disc error to a disc error handler 280, which is designed to receive disc errors from read-write channel 242. In response to the faked disc error, disc error handler 280 terminates the data transfer at step 608 and posts the error code provided in the sense key/code/qualifier fields of the mode page at step 610.

If the command is not a write command at step 602, the command in command buffer 260 is replaced by an illegal command by CPU 272 at step 614. At step 616, sequencer 256 recognizes the command in the buffer as being illegal and sends the illegal command error code set in step 601 to host bus adapter 290.

Under one embodiment, if the initial triggering command is directed to a specific logical block address, this error will only be re-triggered after recovery when the command is applied to the same logical block address. Thus, if the initial triggering command is a write command to logical block address A, a write command to logical block address B will not re-trigger the error. Only another write command to logical block address A will re-trigger the error.

Figure 7:
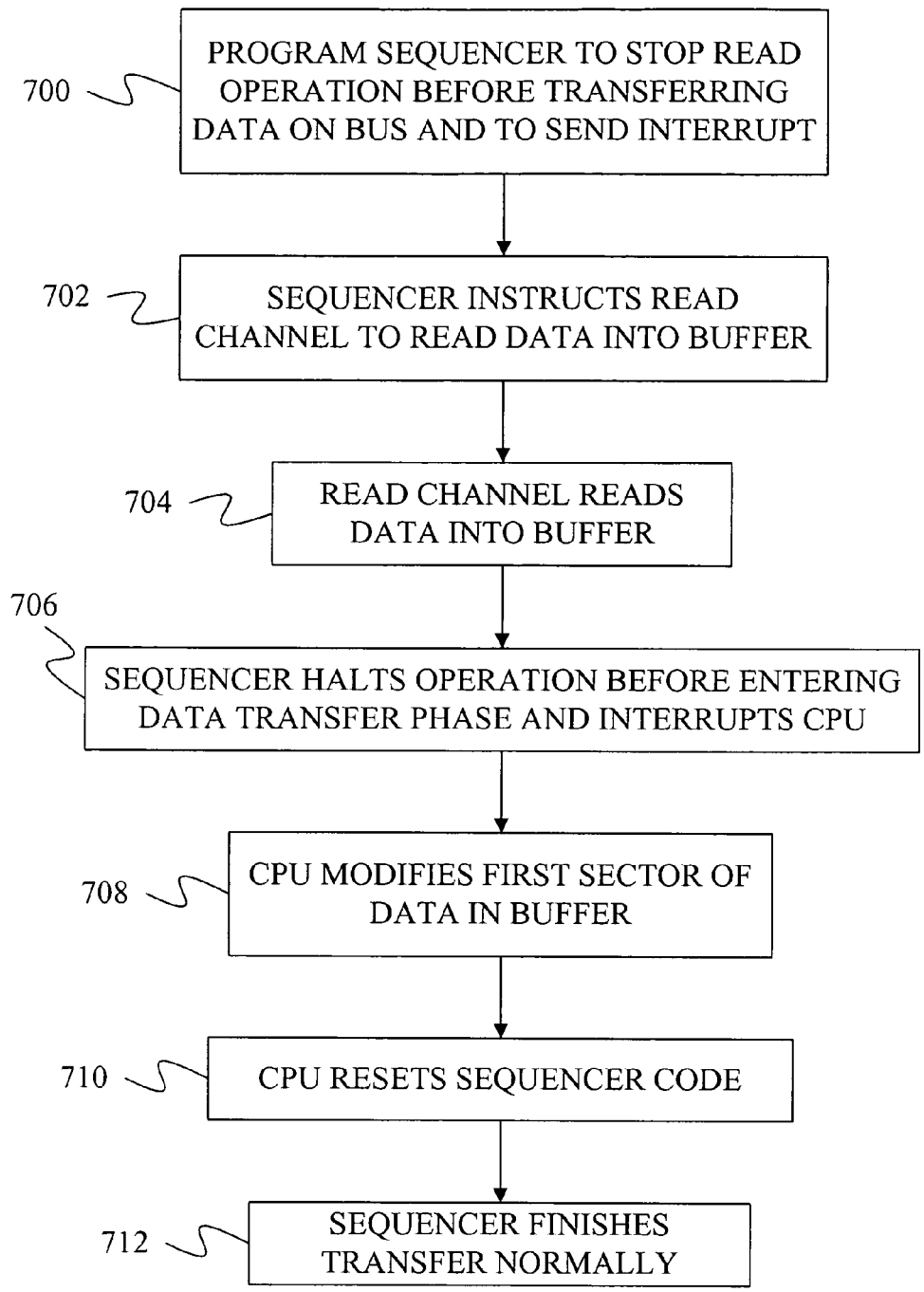
FIG. 7 is a flow diagram of a method of implementing a miscompare error under one embodiment of the present invention.

FIG. 7 provides a flow diagram of a method of injecting a data miscompare error, in which illegal data is returned during the execution of a read command. Upon receiving the triggering read command, the method of FIG. 7 starts at step 700 where CPU 272 programs sequencer 256 so that the sequencer will stop processing the read command just before it is ready to send the first block of data over the bus.

At step 702, the sequencer begins execution of the read command by instructing the read channel 242 to read data from the designated logical block address. Read channel 242 reads the data at step 704 using a recording and reading head 210, which it positions over a physical position on a medium 204 based on the logical block address. This data read by head 210 is detected by read channel 242, and is decoded into a storable format by a data formatter 252 before being stored in buffer 260.

At step 706, sequencer 256 halts the read operation before transferring data across the bus and sends an interrupt to CPU 272. Upon receiving the interrupt, CPU 272 modifies the first sector of data in buffer 260 so that the data includes a data miscompare error at step 708. CPU 272 then resets the code used by sequencer 256 at step 710 so that sequencer 256 can transfer the data normally at step 712.

Figure 8:
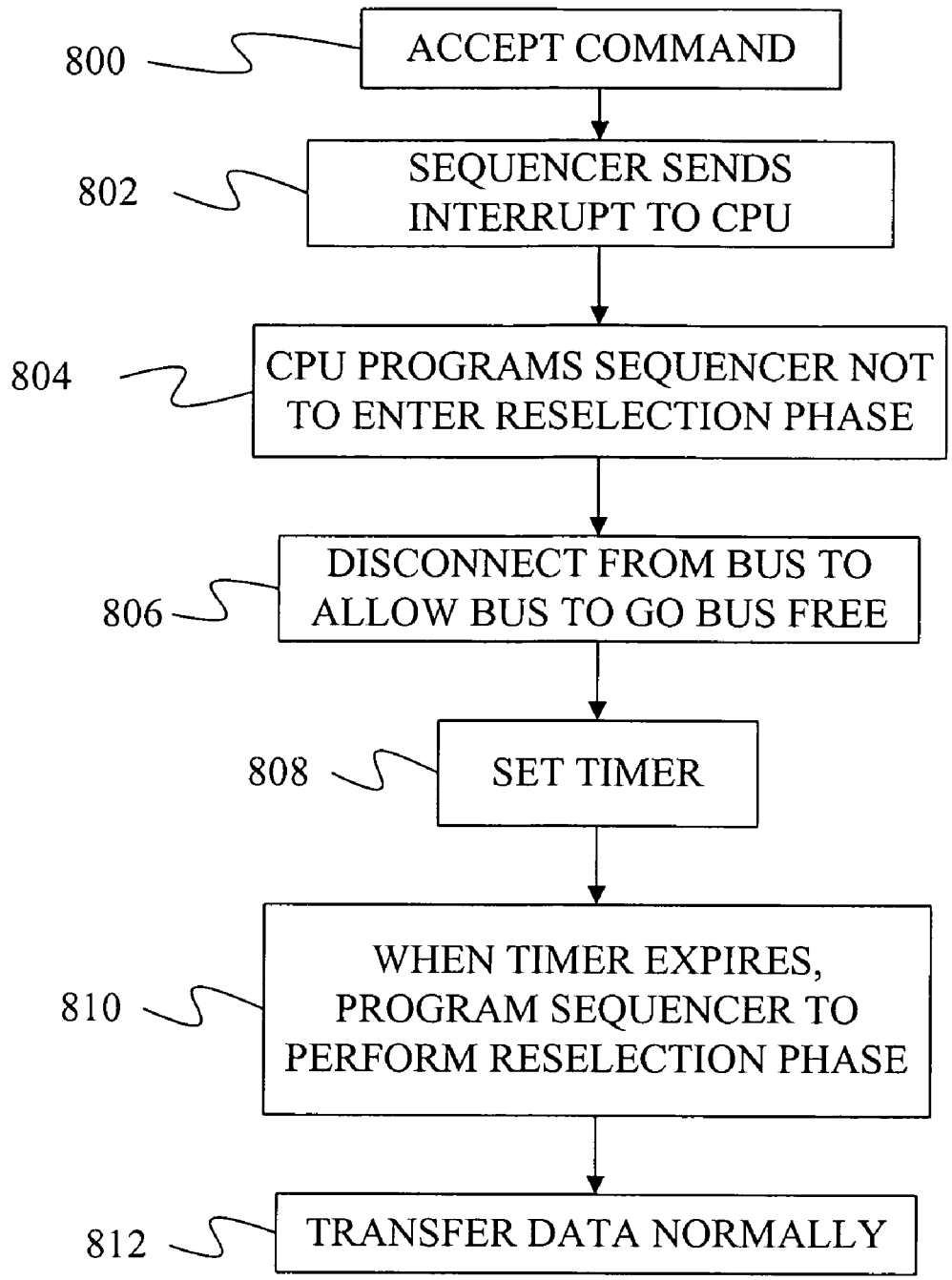
FIG. 8 is a flow diagram of a method of implementing a timeout error before a data transfer under one embodiment of the present invention.

FIG. 8 provides a flow diagram for a method of injecting a time-out error before transferring data during a read or write command. Upon receiving a triggering read or write command, the command is accepted at step 800 and sequencer 256 sends an interrupt to CPU 272 at step 802. CPU 272 programs sequencer 256 to perform the command at step 804 but does not program sequencer 256 to perform the steps necessary to enter the reselection phase, which is used to establish a connection for transferring data. Because of this, sequencer 256 will not reconnect to the bus after it disconnects from the bus.

At step 806, sequencer 256 disconnects from the bus. Such a disconnect step is common for read and write operations and frees the bus while the storage device is executing the command. At step 808, a timer 278 is set using the time-out value found in the error injection mode page. Because sequencer 256 has not been programmed to enter the reselection phase, it is prevented from connecting to the bus while the timer is counting down. When the timer expires at step 810, the sequencer is programmed to perform the reselection phase and the sequencer transfers the data normally at step 812.

The method of FIG. 8 is similar to the method of FIG. 4 except that in FIG. 8, the sequencer disconnects from the bus before transferring data and only disconnects from the bus for a set period of time. In FIG. 4, the sequencer disconnects from the bus until it receives a set number of resets.

Figure 9:
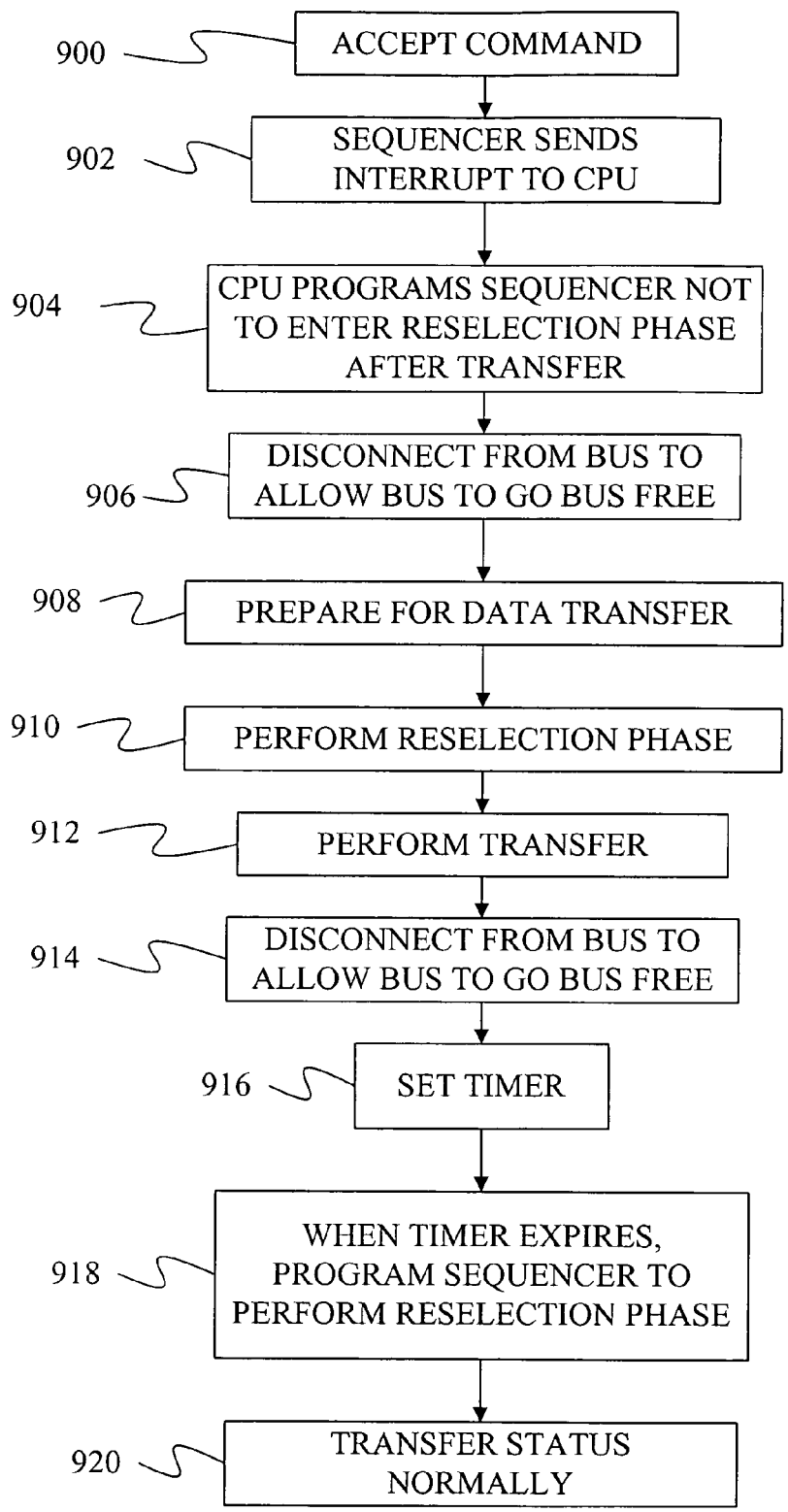
FIG. 9 is a flow diagram of a method of implementing a timeout error after a data transfer under one embodiment of the present invention.

FIG. 9 provides a flow diagram for a method of injecting a time-out error after transferring data during a read or write command. At step 900, the command is accepted and sequencer 256 sends an interrupt to CPU 272 at step 902. After the interrupt, CPU 272 programs sequencer 256 at step 904 so that sequencer 256 will not enter the reselection phase after the transfer is complete and the bus has been released to make a status determination.

At step 906, sequencer 256 disconnects from the bus in its normal fashion to execute the command. Sequencer 256 prepares the data storage device for the transfer at step 908 and at step 910 enters the reselection phase to re-establish a connection to host bus adapter 290. Once connected, the data transfer is performed at step 912. Once the transfer is complete, sequencer 256 disconnects from the bus at step 914 as it would normally.

At step 916, a timer is set using the time-out value found in the error injection mode page. While the timer is counting down, sequencer 256 is prevented from entering the reselection phase and thus prevented from reconnecting to host bus adapter 290. When the timer expires at step 918, sequencer 256 is reprogrammed to enter the reselection phase to provide a connection to host bus adapter 290. Once the connection is established at step 920, sequencer 256 transfers a status to host bus adapter 290.

During the time out periods in FIGS. 8 and 9, the data storage device can be reset through a power cycle, a single bus reset, a message abort or a device message reset.

The present invention therefore includes unexpected and novel advantages as detailed herein and as can be further appreciated from the claims, figures, and description by those skilled in the art. Although particular embodiments are described such as in reference to a disc drive, the present invention has various other embodiments with application to other methods and systems involving a great variety of contemplated embodiments, which lie within the metes and bounds of the claims. These embodiments include optical, magnetic, magnetoresistive, giant magnetoresistive, and other types of disc drives, tape drives, volatile memory, arrays with a plurality of devices, and other specific examples. As another example, while embodiments involving the Small Computer System Interface (SCSI) standard and terms used in the SCSI standard are discussed, it is familiar to those in the art that the SCSI standard evolves over time and appears in different versions, and additional interfaces are contemplated that perform an equivalent function to the SCSI standard. Those in the art will therefore understand that the present invention may be used with other interfaces and interface standards, including those that have not yet risen to popularity but are within the contemplated scope of this invention. In particular, the error modes that produce data miscompares, timeouts, and that allow a sense key to be specified when requesting the error mode can be applied to any interface.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed. It will be appreciated by those skilled in the art that the teachings of the present invention can be applied to a family of systems, devices, and means encompassed by and equivalent to the examples of embodiments described, without departing from the scope and spirit of the present invention. Further, still other applications for the methods, devices, and systems of the present invention are possible.

What is claimed is:

1. A method comprising the steps of:
   receiving a command at a device through a sequencer that controls interactions on a small computer system interface bus;
   programming the sequencer to interrupt a co-processor before executing the command; and
   executing a set of instructions on the co-processor based on a stored error mode page so that a false error condition is generated, wherein executing a set of instructions comprises reprogramming the sequencer so that it is prevented from entering a reselection phase to re-establish a connection across the small computer system interface bus.

2. The method of claim 1 wherein preventing the sequencer from entering a reselection phase comprises preventing the sequencer from entering a reselection phase to re-establish a connection to transfer data.

3. The method of claim 1 wherein preventing the sequencer from entering a reselection phase comprises preventing the sequencer from entering a reselection phase to re-establish a connection to transfer a status after allowing the sequencer to transfer data.

4. The method of claim 1 wherein executing a set of instructions comprises:
   setting a reduced data length for a data transfer; and
   setting instructions for the sequencer to enter an indefinite loop after completing a data transfer.

5. The method of claim 1 wherein executing a set of instructions comprises replacing the command with an illegal command.

6. The method of claim 1 wherein executing a set of instructions comprises:
   determining that the command is a write command;
   instructing the sequencer to execute the write command;
   setting a timer to allow the sequencer to transfer at least one block of data; and
   posting a false error when the timer expires.

7. The method of claim 1 wherein executing a set of instructions comprises reprogramming the sequencer to interrupt the co-processor after a transfer buffer has been filled but before the sequencer begins to transfer data.

8. The method of claim 7 wherein executing a set of instructions further comprises modifying at least some of the data in the transfer buffer so that the data contains at least one error.

9. A device comprising:
a sequencer adapted to be connected to a small computer system parallel interface bus;
a co-processor, coupled to the sequencer and capable of being interrupted by the sequencer and of providing instructions to the sequencer; and
an instruction storage component, communicatively connected to the co-processor and containing processor-executable instructions that are designed to initiate an error condition after the sequencer sends an interrupt to the co-processor, wherein the processor-executable instructions comprise instructions for preventing the sequencer from entering a reselection phase for a period of time so that the sequencer does not establish a connection across the small computer system parallel interface bus.

10. The device of claim 9 wherein preventing the sequencer from entering a reselection phase comprises preventing the sequencer from entering a reselection phase to establish a connection to transfer data.

11. The device of claim 9 wherein preventing the sequencer from entering a reselection phase comprises preventing the sequencer from entering a reselection phase to establish a connection to transfer a status.

12. The device of claim 9 wherein the processor-executable instructions comprise instructions for:
determining a desired data length for data associated with a command;
identifying a reduced data length that is less than the desired data length; and
instructing the sequencer to execute the command using the reduced data length.

13. The device of claim 12 wherein the processor-executable instructions further comprise instructions for instructing the sequencer to enter an indefinite loop after executing the command.

14. The device of claim 9 wherein the processor-executable instructions further comprise instructions for replacing a command with an illegal command.

15. The device of claim 9 wherein the processor-executable instructions further comprise instructions for allowing the sequencer to transfer a portion of a block of data during a write command and generating a false error after the transfer.

16. The device of claim 9 wherein the processor-executable instruction further comprise instructions for changing data read from a medium before the sequencer transmits the data across the small computer system interface parallel interface bus.

17. A method comprising:
receiving a command at a device through a sequencer to generate a false data miscompare error;
programming the sequencer to interrupt a co-processor before executing the command; and
executing a set of instructions comprising reprogramming the sequencer so that it is prevented from entering a reselection phase to re-establish a connection across a small computer system interface bus;
reading data from a storage medium into a memory;
changing at least some of the data in the memory to form corrupted data;
and passing the corrupted data as the data read from the storage medium.

18. A method comprising:
receiving a command at a device through a sequencer indicating that a false timeout error should be generated;
programming the sequencer to interrupt a co-processor before executing the command; and
executing a set of instructions comprising reprogramming the sequencer so that it is prevented from entering a reselection phase to re-establish a connection across a small computer system interface bus; processing a portion of the command; and stopping the processing of the command before completing the command without indicating that processing of the command has stopped.

19. The method of claim 18 wherein receiving a command comprises receiving a read command and wherein processing a portion of the command comprises transferring data.

20. A method comprising:
receiving a command at a storage device through a sequencer to generate a false error, the command comprising at least one sense parameter;
programming the sequencer to interrupt a co-processor before executing the command; and
executing a set of instructions comprising reprogramming the sequencer so that it is prevented from entering a reselection phase to re-establish a connection across a small computer system interface bus; and
generating a false error message from the storage device that indicates that an error has occurred when it has not occurred, the false error message describing the error in part by including the at least one sense parameter.

* * * * *